(12) United States Patent
Sugiyama

(10) Patent No.: US 6,232,592 B1
(45) Date of Patent: May 15, 2001

(54) LIGHT GUIDE MEMBER, ILLUMINATION DEVICE, AND IMAGE READING APPARATUS USING THEM

(75) Inventor: Miho Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,113

(22) Filed: Jul. 8, 1999

(30) Foreign Application Priority Data

Jul. 10, 1998 (JP) ................................... 10-211987

(51) Int. Cl.[7] .................................................. H01J 40/14
(52) U.S. Cl. ................... 250/227.11; 250/208.1; 362/297; 358/475
(58) Field of Search ................... 250/227.11, 208.11; 347/2, 3; 358/475, 480, 484, 509, 510; 351/834; 362/296, 297, 551

(56) References Cited

U.S. PATENT DOCUMENTS 5,319,527 * 6/1994 Murphy et al. ....................... 362/111
5,986,253 * 11/1999 Tabata .................................. 250/208.1
6,088,074 * 7/2000 Suzuki ..................................... 349/62

FOREIGN PATENT DOCUMENTS 9-61633  3/1997  (JP) .

* cited by examiner

Primary Examiner—Stephone B. Allen
(74) Attorney, Agent, or Firm—Fitzpatrick, Cella, Harper & Scinto

(57) ABSTRACT

A light guide member includes a columnar light transmission member having an end face as a light incident surface, a light emergent surface on part of a side surface of the columnar light transmission member, and a saw-toothed reflection portion on a surface opposing the light emergent surface. The saw-toothed reflection portion is made up of a plurality of reflection surfaces. An angle of a reflection surface farther away from the light incident surface with respect to a longitudinal direction of the light guide member is larger than an angle of a reflection surface closer to the light incident surface with respect to the longitudinal direction.

25 Claims, 4 Drawing Sheets

LIGHT GUIDE MEMBER, ILLUMINATION DEVICE, AND IMAGE READING APPARATUS USING THEM

BACKGROUND OF THE INVENTION

1. Field of the Invention

The present invention relates to a light guide member, an illumination device, and an image reading apparatus using them and, more particularly, to an apparatus for illuminating an original with a linear light beam while optically illuminating, guiding the light beam from the original onto a light-receiving surface to form an original image, and reading the original image.

2. Related Background Art

FIG. 1 is a view for explaining a prior art (Japanese Patent Application Laid-Open No. 9-61633). A light beam from a light-emitting member 41 is incident on a columnar light guide member 45 from its end portion and propagates in the columnar light guide member 45. The light beam illuminating a light-diffusing portion 43 is diffused, and part of the diffused light beam emerges downward from a light emergent portion 44 in FIG. 1.

FIG. 2 is a view for explaining an optical path when the prior art in FIG. 1 is applied to an image reading apparatus. Reference numeral 46 in FIG. 1 denotes an imaging lens of an image reading system; and 47, a transmission original.

In this apparatus, light beam from the light-emitting member 41 enters into the columnar light guide member 45 from a light incident surface 42 at the end portion of the light guide member 45 and propagates through the light guide member 45. The light beam then emerges outside the light guide member 45 from the light emergent portion 44 formed on the outer surface along the longitudinal direction. The exit light beam illuminates the transmission original 47. An image of the transmission original 47 illuminated with the light beam is formed on the surface of a light-receiving element (not shown) by the imaging lens 46, thereby reading the image.

Generally, in an illumination device using a light guide member, of all the light beams repeating total reflection in the light guide member, light beam that does not satisfy the total reflection condition on the inner wall of the light guide member and emerges outside the light guide member is used to illuminate the original. When a reflection/diffusion surface is formed on the surface opposing the light emergent surface, an amount of light beam directly reflected by a reflection/diffusion surface and emerging outside from the light emergent portion without total reflection is relatively large in all the light beam incident on the light guide member.

In particular, as in the conventional case, when the light-diffusing surface is a saw-toothed reflection surface and the saw-toothed projections are formed on the reflection surface at an equal pitch, part of the light beam directly emerging from the light emergent portion does not enter the pupil of the imaging lens, resulting in low illumination efficiency.

SUMMARY OF THE INVENTION

It is an object of the present invention to provide a light guide member wherein a light beam incident from a light incident surface, reflected by a saw-toothed reflection portion, and emerging from the light guide member can be focused at a predetermined focusing position to efficiently use the light beam, an illumination apparatus whose illumination efficiency is improved using the light guide member, and an image reading apparatus using the light guide member and illumination device.

A light guide member of the present invention is characterized by comprising a columnar light transmission member having an end face as a light incident surface, a light emergent surface on part of an outer surface of the columnar light transmission member, and a saw-toothed reflection portion on a surface opposing the light emergent surface, wherein the saw-toothed reflection portion is made up of a plurality of reflection surfaces, and an angle of a reflection surface farther away from the light incident surface with respect to a longitudinal direction of the light guide member is larger than an angle of a reflection surface closer to the light incident surface with respect to the longitudinal direction.

A light guide member of the present invention is characterized by comprising a columnar light transmission member having an end face as a light incident surface, a light emergent surface on part of an outer surface of the columnar light transmission member, and a saw-toothed reflection portion on a surface opposing the light emergent surface, wherein the saw-toothed reflection portion is made up of a plurality of reflection surfaces, each reflection surface is set to reflect the light beam from the light incident surface to a predetermined focusing position, and the following equation holds:

$$x=(\tfrac{1}{2})[\{90°-\tan^{-1}(|m|/D)\}-\{\tan^{-1}(H/|L|)\}]$$

for ±5° of $a=90°-\tan^{-1}(H/L)-x$
where
a: the tilt angle of the reflection surface with respect to the longitudinal direction of the light guide member
H: the distance between a light incident position of the light incident surface and the reflection surface in a section perpendicular to the longitudinal direction of the light guide member
L: the distance between the light incident surface of the light beam to be reflected and the reflection surface by which the light beam is reflected in the longitudinal direction of the light guide member
m: the distance between the focusing position and the reflection surface in the longitudinal direction of the light guide member
D: the distance between the focusing position and the reflection surface in a section perpendicular to the longitudinal direction of the light guide member.

A light guide member of the present invention is particularly characterized in that
the light guide member has a columnar shape,
the light incident surface is formed at each of two ends in the longitudinal direction,
the light incident surface is formed at one of two ends in the longitudinal direction, and an end reflection surface is formed on the other of the two ends,
the reflection surface has a reflectance of not less than 80%, or
the light emergent surface has a shape having a focusing function.

The light guide member of the present invention is particularly used in an illumination device for making a light beam from a light source incident on the light incident surface of the light guide member to illuminate an illumination target with the light beam emerging from the light emergent surface.

An illumination device using the light guide member of the present invention is characterized in that the light source is an LED arranged at the light incident position of the light incident surface, the light source is a monochromatic LED, or the light source is made up of color LEDs.

The illumination device using the light guide member of the present invention is particularly used as illumination means for an image reading apparatus for making the light beam from an original illuminated with the illumination means incident on an imaging lens, guiding the light beam from the imaging lens onto a surface of a light-receiving element, forming an image of the original on the surface of the light-receiving element, and reading the image.

An imaging reading apparatus using the illumination device of the present invention is characterized in that the imaging lens is located at the focusing position, or a light beam transmitted through the original illuminated with the illumination device is incident on the imaging lens.

According to the light guide member having the above arrangement, the light beam incident on the light guide member is not totally reflected on the inner wall, but is directly reflected by the reflecting portion. The reflected light beam emerging outside the light guide member from the light emergent portion is efficiently focused at the predetermined focusing position. Therefore, the efficiency of the light beam focused by the lens located at the focusing position can be improved.

Since the light guide member has a columnar shape, the light beam from the light incident surface can be efficiently guided into a linear light beam with a simple shape.

Since the light incident surfaces are formed at the two ends in the longitudinal direction, an amount of incident light beam can be increased to obtain a more uniform light amount distribution.

Since the light incident surface is formed at one of the two ends in the longitudinal direction, and the end reflection surface is formed at the other of the two ends, an illumination apparatus using the light guide member can have a simple light source and can be made compact.

Since the reflection surface has a reflectance of 80% or more, the incident light beam can be efficiently guided to the light emergent surface.

Since the light emergent surface has a shape having a focusing function, the exit light beam can be efficiently guided to the illumination target surface.

The light guide member of the present invention allows efficient illumination.

The illumination device of the present invention can efficiently guide the light beam from the original onto the surface of the light-receiving element to allow read operation in good conditions, thereby obtaining a high-speed apparatus.

DETAILED DESCRIPTION OF THE PREFERRED EMBODIMENTS

Figure 1:
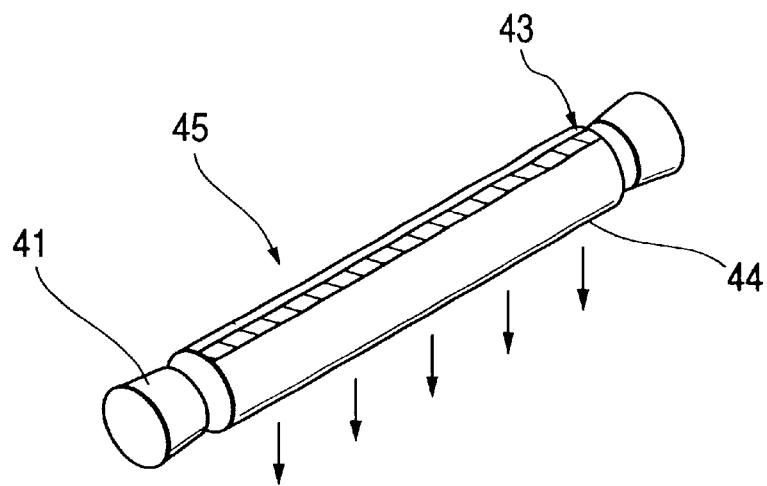
FIG. 1 is a perspective view showing a conventional light guide member.
Figure 2:
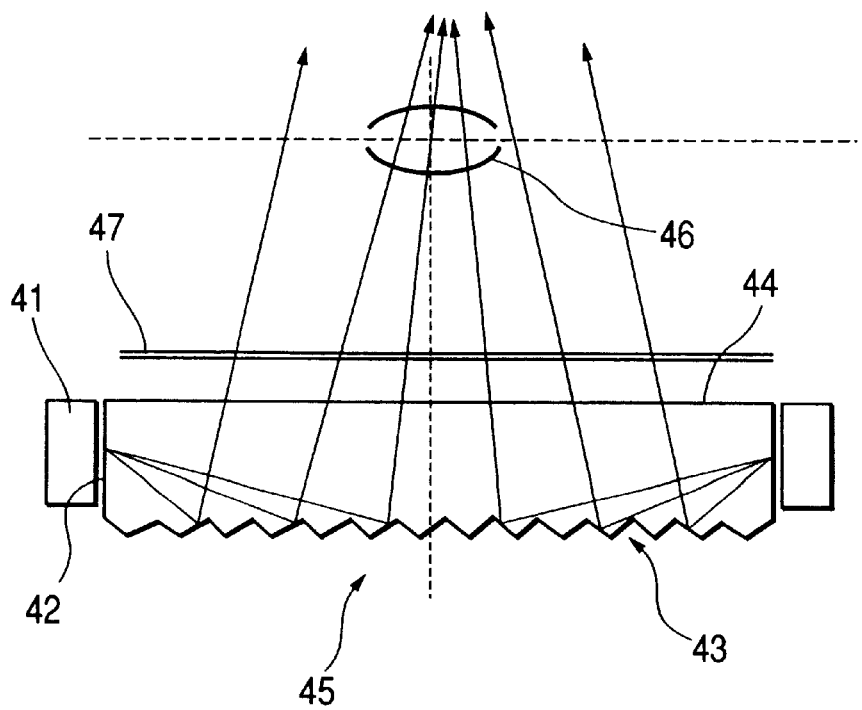
FIG. 2 is a view for explaining an optical path when the conventional light guide member is applied to an image reading apparatus.
Figure 3A:
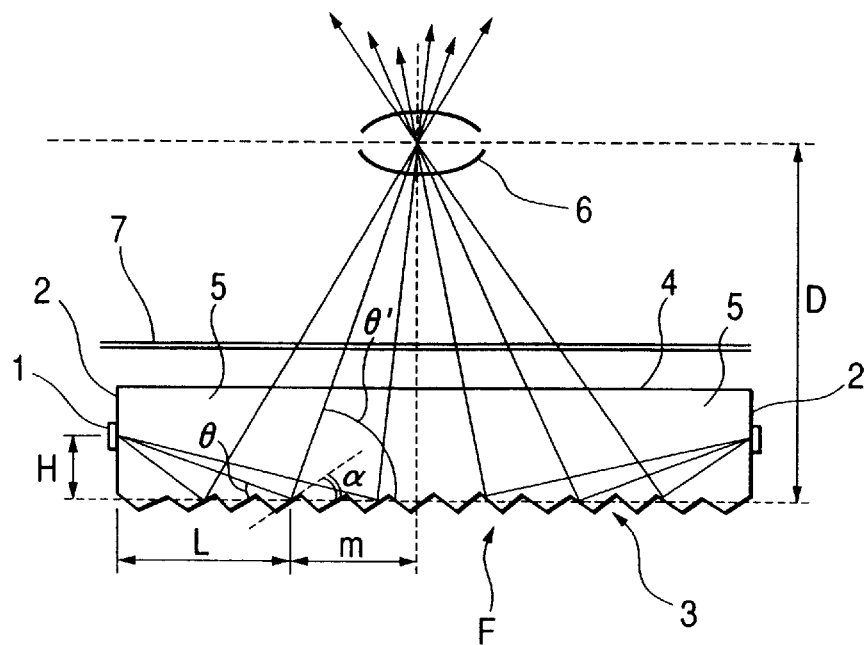
FIG. 3A is a view for explaining an illumination system according to the first embodiment of the present invention.
Figure 3B:
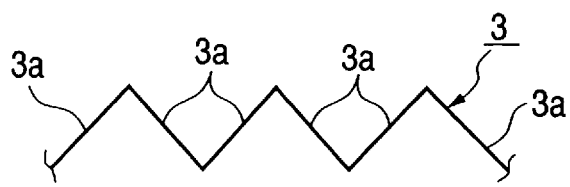
FIG. 3B is an enlarged view showing part of the illumination system shown in FIG. 3A.
Figure 4:
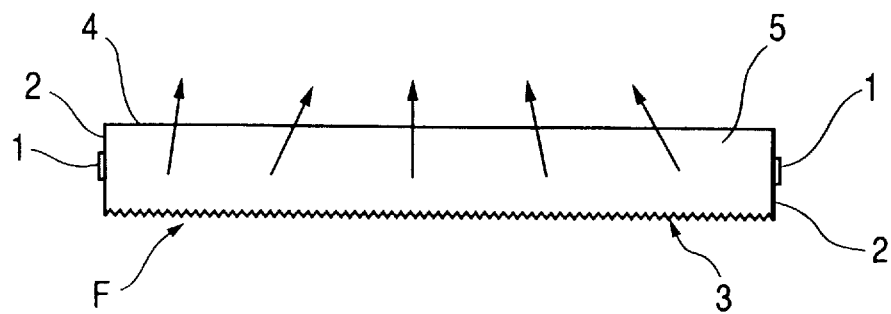
FIG. 4 is a view for explaining a light guide member according to the first embodiment of the present invention.
Figure 5:
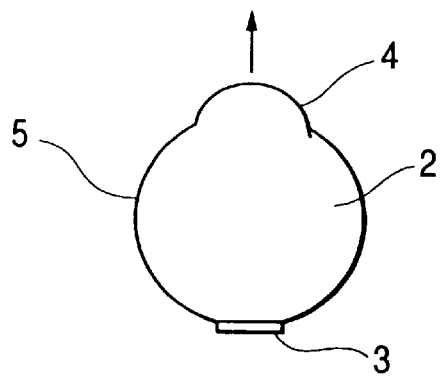
FIG. 5 is a view for explaining the light guide member according to the first embodiment of the present invention.
Figure 6:
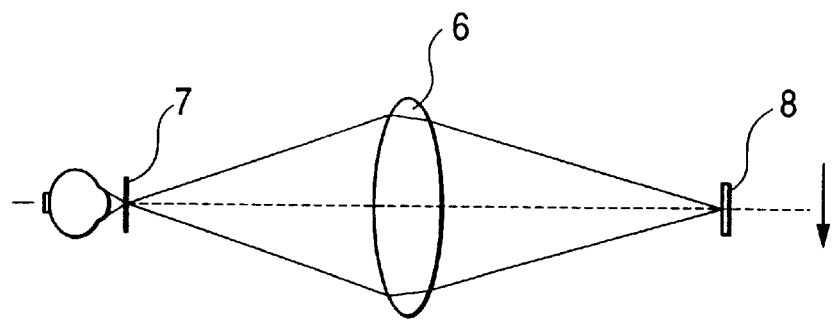
FIG. 6 is a view for explaining an image reading apparatus according to the first embodiment of the present invention.

FIGS. 3A, 3B, 4, 5, and 6 are views showing the first embodiment of the present invention. FIGS. 3A and 3B are views for explaining an illumination system including a light guide member as the characteristic feature of this embodiment. FIG. 4 is a longitudinal sectional view of the light guide member. FIG. 5 is a cross-sectional view (i.e., a section perpendicular to the longitudinal direction of the light guide member) of the light guide member. FIG. 6 is a view showing an example in which the light guide member is applied to an image reading apparatus.

Referring to FIGS. 3A, 3B, 4, 5, and 6, a light source 1 comprises an LED or the like. A columnar light guide member F guides a light beam from the light source 1 and outputs it as an illumination light beam.

The light guide member F has light incident portions 2 formed at its two ends along the longitudinal direction, a saw-toothed reflection portion 3 formed on the inner portion of the side surface along the longitudinal direction of the light guide member F, a light emergent portion 4 formed at a position opposing the saw-toothed reflection portion 3, and a light guide portion 5 for guiding the light beam from the light source 1.

An imaging lens 6 guides the illumination light beam onto the light-receiving surface to form the image of a transmission original 7 on the light-receiving surface. A light-receiving element 8 converts the original image formed on the light-receiving surface into an electrical signal so as to read the image.

The light guide member F of this embodiment will now be described below (FIGS. 3A, 3B, 4, and 5).

A light beam from the light source 1 made up of known R (red), G (green), and B (blue) LEDs is incident on the light guide member F from the light incident surface 2 and propagates in the light guide portion 5 while being totally reflected by the light guide portion 5. At the same time, part of the light beam impinges on the saw-toothed reflection portion 3 having a reflectance of 80% or more and is reflected to the light emergent portion 4. As shown in FIG. 3B, the saw-toothed reflection portion 3 has a plurality of reflection surfaces 3a. The reflection surfaces 3a do not simply diffuse the light beam, but reflect the light beam at predetermined angles, and guide the light beam to the light emergent portion 4. The light beam efficiently strikes the inner wall of the light emergent portion 4 at an angle smaller than the total reflection angle. The light emergent surface 4 has a shape (curve) having a focusing effect on the cross-section of the light guide member F. With the above arrangement, the light beam emerges with directivity from the light emergent portion 4 and appropriately illuminates the transmission original 7. Note that the light guide member F is a resin-molded columnar member having a length enough to illuminate the illumination area of the transmission original 7. As shown in FIG. 5, the cross-sectional shape of the light guide member F is almost circular, and the light guide member F itself is almost cylindrical. The cross-sectional shape of the light guide member F may be rectangular, trapezoidal, or any other shape similar to it.

The light guide member F of this embodiment is a columnar light-transmitting member having an end face as the light incident surface 2, the light emergent surface 4 at part of its outer surface, and the saw-toothed reflection portion 3 on the surface opposing the light emergent surface 4. The saw-toothed reflection portion 3 is made up of the plurality of reflection surfaces 3a. An angle a of each reflection surface 3a farther away from the light incident surface with respect to the longitudinal direction of the light guide member F is set larger than an angle of each reflection surface 3a closer to the light incident surface with respect to the longitudinal direction.

The saw-toothed reflection portion 3 has a saw-toothed shape along the longitudinal section of the light guide member F, a thin linear shape along the widthwise direction of the light guide member F, and an elongate area along the side surface in the longitudinal direction of the light guide member. The saw-toothed reflection portion 3 has the same width at any position along the longitudinal direction of the light guide member F or a larger width at a position farther away from the light source 1 so as to appropriately correct the irradiation light amount distribution along the longitudinal direction. A pitch p of the reflecting surfaces 3a forming the saw-toothed shape is uniform at any position along the longitudinal direction or decreases at a position farther away from the light source 1 so as to appropriately correct the irradiation light amount distribution along the longitudinal direction.

The tilt angle of the saw-toothed reflection surface as the characteristic feature of the present invention will be described in detail (FIGS. 3A and 3B).

In general light guide member illumination, part of all the light beam repeating total reflection in the light guide member, which does not satisfy the total reflection conditions on the inner wall of the light guide member F and emerges outside the light guide member F, is used to illuminate the original. As in this embodiment, when the reflection portion 3 is formed on the surface opposing the light exist surface 4, an amount of light beam directly reflected by the reflection portion 3 and emerging outside the light emergent portion 4 without total reflection is relatively large. To make this light beam illuminate the transmission original 7 and a larger number of light beam components having image information of the transmission original 7 reach the light-receiving element 8, it is effective to illuminate the original so as to make the light beam (i.e., the light beam incident on the light guide member, directly reflected by the saw-toothed reflection surfaces, and emerging outside from the light emergent portion without total reflection) incident on the pupil of the imaging lens 6. In order to cause light beam emerging from the light source at an angle θ to be incident on the pupil of the imaging lens 6 at an angle θ' by reflecting it by the saw-toothed reflection surface 3, a tilt angle a of a reflection surface 3a of the saw-toothed reflection surface 3 is preferably set as follows.

To realize this, according to this embodiment, a tilt angle α of each reflection surface 3a of the saw-toothed reflection portion 3 with respect to the longitudinal direction of the light guide member F is set to fall within ±5° of an angle in which the beam is reflected toward the center of the pupil of the imaging lens 6 as follows, so that the light beam emerges within the range of ±10° with respect to (imaginary) light beam which is incident on the center of centered on the pupil of the lens:

$$x=(\tfrac{1}{2})[\{90°-\tan^{-1}(|m|/D)\}-\{\tan^{-1}(H/|L|)\}]$$

for $a=90°-\tan^{-1}(H/L)-x$ where a: the tilt angle of the reflection surface 3a with respect to the longitudinal direction of the light guide member H: the distance between a light incident position 2a of the light incident surface 2 and the reflection surface 3a in a section perpendicular to the longitudinal direction of the light guide member L: the distance between the light incident surface 2 and the reflection surface 3a in the longitudinal direction of the light guide member m: the distance between the center of the pupil (i.e., focusing position) of the lens 6 and the reflection surface 3a in the longitudinal direction of the light guide member D: the distance between the center of the pupil of the lens 6 and the reflection surface 3a in a section perpendicular to the longitudinal direction of the light guide member.

As described above, the light beam is guided within the range of ±10° centered on the pupil of the imaging lens 6. Therefore, the most of the light beam components can be incident in the aperture angle range corresponding to the F-number of the imaging lens 6 of the image reading apparatus.

For example, even if a bright imaging lens having an F-number of about 5 is used as the imaging lens 6 of the image reading apparatus, the light beam can reach the light-receiving element 8, provided that the light beam from the original 7 falls within the range of ±10° centered on the pupil.

Image read operation will be described below (FIG. 6).

The light guide member F of the present invention is disposed closer to the transmission original 7. A light beam from the light guide member F directly illuminates the original 7. Image information of the transmission original 7 is focused on the light-receiving element (1-line sensor) 8 serving as a reading means by the imaging lens 6 at a predetermined magnification.

At this time, the length of the light emergent portion 4 of the light guide member F is equal to or larger than the original read width, so that the read area of the original can be sufficiently illuminated. A position of the transmission original 7 is changed relative to the imaging lens 6 and the line sensor 8 (in this embodiment, the illumination device, the imaging lens 6, and the line sensor 8 are moved (scanned) in an arrowed direction (subscanning direction) in FIG. 6) to read the transmission original 7 as two-dimensional image information by the line sensor 8.

To read a color image, the above operation is repeated in units of RGB colors. For example, only the R LED is turned on to read the original, and then only the G LED is turned on to read the original. In this manner, the original is sequentially read in units of colors. Note that although the optical path of the apparatus in FIG. 6 is linear, but may be bent using a reflection mirror arranged midway along the optical path.

As described above, the light amount distribution of the illumination light beam in the longitudinal direction of the light guide member is corrected by changing the longitudinal pitch or width of the saw-toothed reflection portion 3. The light amount distribution as a correction target may be a distribution to be corrected into a uniform distribution depending on an object to be illuminated or a distribution generated by the cosine fourth law of the imaging lens 6 in the image reading system as shown in FIG. 6 to be corrected. The angle distribution of the tilt angle α of the reflection surfaces 3a forming the saw-toothed reflection portion may be appropriately set within the angle range so as to correct the light amount distribution generated by the cosine fourth law of the imaging lens 6.

As described above, according to this embodiment, the tilt angle a of the reflection surfaces 3a constituting the reflection portion 3 is set such that the light beam incident on the light guide member F, directly reflected by the saw-toothed reflection portion 3, and emerging outside from the light emergent portion 4 without total reflection is incident on the pupil of the imaging lens 6. A larger number of light beam components passing through the transmission original 7 and having image information of the original 7 can effectively reach the light-receiving element 8. Therefore, image read operation can be performed under better conditions.

Figure 7:
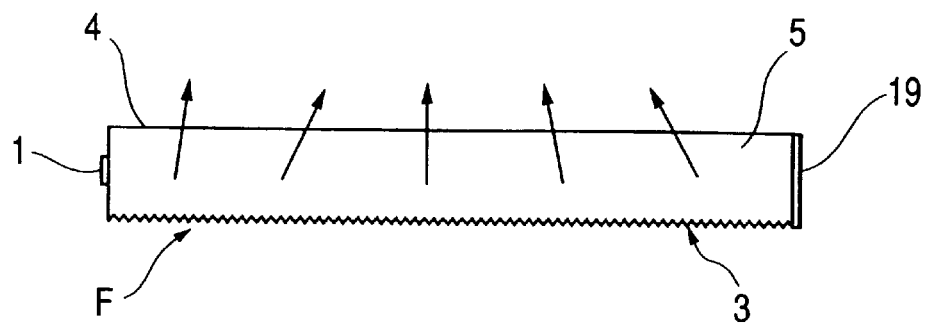
FIG. 7 is a view for explaining an illumination device according to the second embodiment of the present invention.

FIG. 7 is a schematic view showing an illumination device according to the second embodiment of the present invention. The basic arrangement of the second embodiment is substantially the same as that of the first embodiment, the same reference numerals as in the first embodiment denote the same parts in the second embodiment, and a repetitive description thereof will be omitted.

According to the characteristic feature of the second embodiment, a light source 1 is arranged as a light incident surface 2 on one end face of a light guide member F, and a light reflection surface (end reflection surface) 19 is formed at the other end face.

With the above arrangement, the number of light sources can be reduced to result in low cost. Since the light source 1 is arranged on only one side of the light guide member F without reducing the number of LEDs, the LED on the opposing end can be omitted to allow arranging a more compact illumination device.

Figure 8:
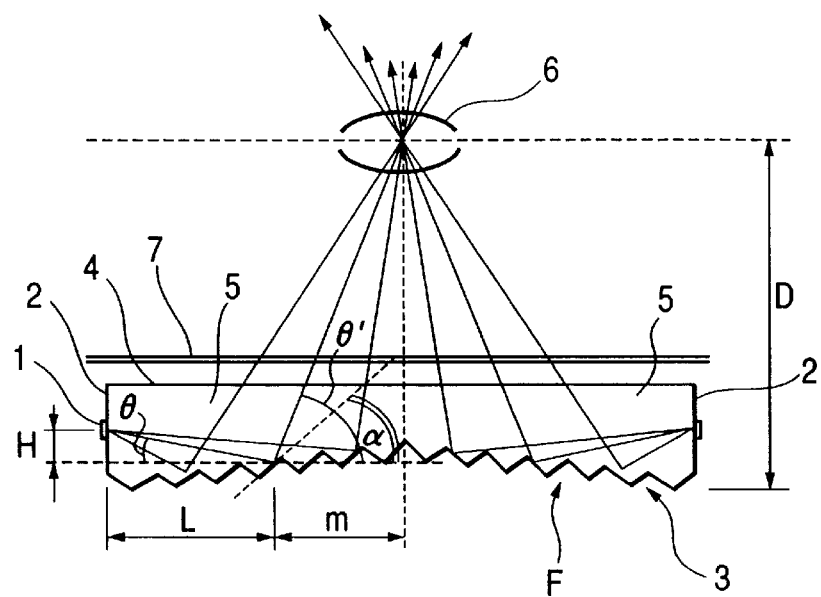
FIG. 8 is a view for explaining an illumination system according to the third embodiment of the present invention.
Figure 9:
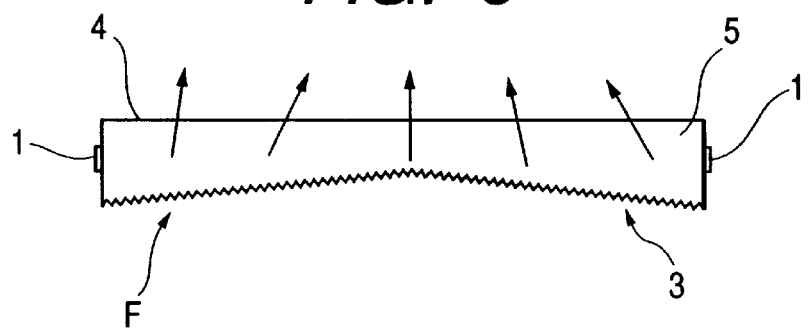
FIG. 9 is a view for explaining a light guide member according to the third embodiment of the present invention.

FIGS. 8 and 9 are views showing the third embodiment of the present invention. The basic arrangement of the third embodiment is substantially the same as the first embodiment, the same reference numerals as in the first embodiment denote the same parts in the third embodiment, and a repetitive description thereof will be omitted.

Figure 10:
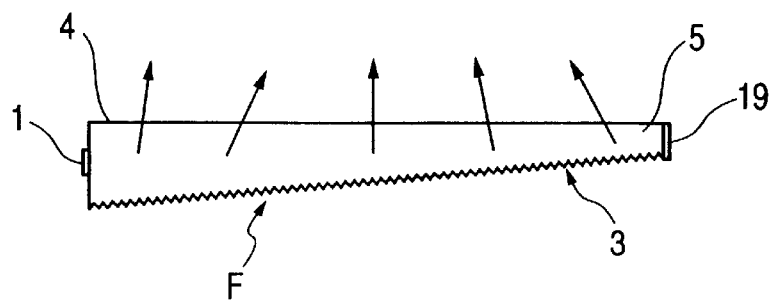
FIG. 10 is a view for explaining a light guide member according to the fourth embodiment of the present invention.

In the third embodiment, the cross-sectional area of a light guide member F is decreased at a position farther away from a light source 1 along the longitudinal direction. The light guide member F has a shape to moderate inappropriateness of the light amount distribution in the longitudinal direction. In this case, a saw-toothed reflection portion 3 is also tilted, as shown in FIG. 9 or 10. A tilt angle α of a reflection surface 3a of the reflection portion 3 is applied to each reflection surface.

In this embodiment, in order to vary the cross-sectional area along the longitudinal direction, the saw-toothed reflection portion 3 is tilted, and a light emergent portion 4 is made parallel to an area to be illuminated. However, the present invention is not limited to this. The saw-toothed reflection portion 3 may be made parallel to the area to be illuminated, and the light emergent portion 4 may be tilted. Alternatively, both the saw-toothed reflection portion 3 and the light emergent portion 4 may be tilted.

According to this embodiment, an illumination device having a better light amount distribution can be realized.

FIG. 10 is a schematic view showing the fourth embodiment of the present invention. The basic arrangement of the fourth embodiment is substantially the same as those of the second and third embodiments, the same reference numerals as in the second and third embodiments denote the same parts in the fourth embodiment, and a repetitive description thereof will be omitted.

According to the characteristic feature of the fourth embodiment, a light source 1 is arranged on only one side of a light guide member F, a light reflection surface 19 is arranged on the other side, and the cross-sectional area of the light guide member F is decreased at a position farther away from the light source 1. With this arrangement, in an illumination device having a better light amount distribution, the number of LED light sources can be reduced to result in low cost.

As has been described above, according to the present invention, there can be provided a light guide member for guiding, to a predetermined focusing position, a light beam incident from a light incident surface and reflected by a saw-toothed reflection portion to efficiently use the light beam, an illumination device using the light guide member to improve illumination efficiency, and an image reading apparatus using the light guide member and illumination device.

According to a light guide member of the present invention, the light beam incident on the light guide member, directly reflected by the reflection portion, and emerging outside from the light emergent portion without total reflection can be efficiently guided to the predetermined focusing position. Therefore, efficiency of the light beam focused by the lens located at the focusing position can be improved.

Since the light guide member has a columnar shape, the light beam from the light incident surface can be efficiently guided into a linear light beam with a simple shape.

Since the light incident surfaces are formed at the two ends in the longitudinal direction, an amount of incident light beam can be increased to obtain a more uniform light amount distribution.

Since the light incident surface is formed at one of the two ends in the longitudinal direction, and the end reflection surface is formed at the other of the two ends, an illumination apparatus using the light guide member can have a simple light source and can be made compact.

Since the reflection surface has a reflectance of 80% or more, the incident light beam can be efficiently guided to the light emergent surface.

Since the light emergent surface has a shape having a focusing function, the exit light beam can be efficiently guided to the illumination target surface.

The light guide member of the present invention allows efficient illumination.

The illumination device of the present invention can efficiently guide the light beam from the original onto the surface of the light-receiving element to allow read operation in good conditions, thereby obtaining a high-speed apparatus.

What is claimed is:

1. A light guide member comprising a columnar light transmission member having an end face as a light incident surface, a light emergent surface on part of a side surface of said columnar light transmission member, and a saw-toothed reflection portion on a surface opposing said light emergent surface, wherein said saw-toothed reflection portion is made up of a plurality of reflection surfaces, and an angle of a reflection surface farther away from said light incident surface with respect to a longitudinal direction of said light guide member is larger than an angle of a reflection surface closer to said light incident surface with respect to the longitudinal direction.

2. A light guide member according to claim 1, wherein said light guide member has a columnar shape.

3. A light guide member according to claim 1, wherein said light incident surface is formed at each of two ends in the longitudinal direction.

4. A light guide member according to claim 1, wherein said light incident surface is formed at one of two ends in the longitudinal direction, and an end reflection surface is formed on the other of the two ends.

5. A light guide member according to claim 1, wherein said reflection surface has a reflectance of not less than 80%.

6. A light guide member according to claim 1, wherein said light emergent surface has a shape having a focusing function.

7. A light guide member according to claim 1, wherein said light guide member is used in an illumination device for making a light beam from a light source incident on said light incident surface of said light guide member to illuminate an object to be illuminated with the light beam emerging from said light emergent surface.

8. A light guide member according to claim 7, wherein said light source is an LED arranged at the light incident position of said light incident surface.

9. A light guide member according to claim 7, wherein said light source is a monochromatic LED.

10. A light guide member according to claim 7, wherein said light source is made up of color LEDs.

11. A light guide member according to claim 7, wherein said illumination device is used as illumination means for an image reading apparatus for making the light beam from an original illuminated with said illumination means incident on an imaging lens, guiding the light beam from said imaging lens onto a surface of a light-receiving element, forming an image of the original on said surface of said light-receiving element, and reading the image.

12. A light guide member according to claim 11, wherein a light beam transmitted through the original illuminated with said illumination device is incident on said imaging lens.

13. A light guide member comprising a columnar light transmission member having an end face as a light incident surface, a light emergent surface on part of a side surface of said columnar light transmission member, and a saw-toothed reflection portion on a surface opposing said light emergent surface, wherein said saw-toothed reflection portion is made up of a plurality of reflection surfaces, each reflection surface is set to reflect the light beam from said light incident surface to a predetermined focusing position, and the following equation holds:

$$x=(\tfrac{1}{2})[\{90°-\tan^{-1}(|m|/D)\}-\{\tan^{-1}(H/|L|)\}]$$

for ±5° of a=90°−tan⁻¹(H/L)−x where a: the tilt angle of said reflection surface with respect to the longitudinal direction of said light guide member H: the distance between a light incident position of said light incident surface and said reflection surface in a section perpendicular to the longitudinal direction of said light guide member L: the distance between said light incident surface of the light beam to be reflected and said reflection surface in the longitudinal direction of said light guide member m: the distance between the focusing position and said reflection surface in the longitudinal direction of said light guide member D: the distance between the focusing position and said reflection surface in a section perpendicular to the longitudinal direction of said light guide member.

14. A light guide member according to claim 13, wherein said light guide member has a columnar shape.

15. A light guide member according to claim 13, wherein said light incident surface is formed at each of two ends in the longitudinal direction.

16. A light guide member according to claim 13, wherein said light incident surface is formed at one of two ends in the longitudinal direction, and an end reflection surface is formed on the other of the two ends.

17. A light guide member according to claim 13, wherein said reflection surface has a reflectance of not less than 80%.

18. A light guide member according to claim 13, wherein said light emergent surface has a shape having a focusing function.

19. A light guide member according to claim 13, wherein said light guide member is used in an illumination device for making a light beam from a light source incident on said light incident surface of said light guide member to illuminate an object to be illuminated with the light beam emerging from said light emergent surface.

20. A light guide member according to claim 19, wherein said light source is an LED arranged at the light incident position of said light incident surface.

21. A light guide member according to claim 19, wherein said light source is a monochromatic LED.

22. A light guide member according to claim 19, wherein said light source is made up of color LEDs.

23. A light guide member according to claim 19, wherein said illumination device is used as illumination means for an image reading apparatus for making the light beam from an original illuminated with said illumination means incident on an imaging lens, guiding the light beam from said imaging lens onto a surface of a light-receiving element, forming an image of the original on said surface of said light-receiving element, and reading the image.

24. A light guide member according to claim 23, wherein said imaging lens is located at the focusing position.

25. A light guide member according to claim 24, wherein a light beam transmitted through the original illuminated with said illumination device is incident on said imaging lens.

* * * * *

UNITED STATES PATENT AND TRADEMARK OFFICE
CERTIFICATE OF CORRECTION

PATENT NO. : 6,232,592 B1
DATED : May 15, 2001
INVENTOR(S) : Miho Sugiyama

It is certified that error appears in the above-identified patent and that said Letters Patent is hereby corrected as shown below:

Column 5,
Lines 18 & 66, "angle a" should read -- angle $\alpha$ --.

Column 7,
Line 19, "angle a" should read -- angle $\alpha$ --.

Signed and Sealed this

Eighth Day of January, 2002

Attest:

Attesting Officer

JAMES E. ROGAN
Director of the United States Patent and Trademark Office